US012798081B2

(12) United States Patent
Okamura et al.

(10) Patent No.: US 12,798,081 B2
(45) Date of Patent: Nov. 17, 2026

(54) MULTIPLE ACTUATOR CONTROL ON A SOFT EVERTING ROBOT

(71) Applicant: The Board of Trustees of the Leland Stanford Junior University, Stanford, CA (US)

(72) Inventors: Allison M. Okamura, Mountain View, CA (US); William E. Heap, Stanford, CA (US); Alexander M. Kuebler, Zürich (CH); Nathaniel E. Agharese, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 19/108,480

(22) PCT Filed: Sep. 20, 2023

(86) PCT No.: PCT/US2023/033227
§ 371 (c)(1),
(2) Date: Mar. 4, 2025

(87) PCT Pub. No.: WO2024/064191
PCT Pub. Date: Mar. 28, 2024

(65) Prior Publication Data

US 2026/0084291 A1 Mar. 26, 2026

Related U.S. Application Data

(60) Provisional application No. 63/408,312, filed on Sep. 20, 2022.

(51) Int. Cl.
*B25J 9/10* (2006.01)

(52) U.S. Cl.
CPC .................................... *B25J 9/10* (2013.01)

(58) Field of Classification Search
CPC ....................................................... B25J 9/10
USPC ........................................................ 74/1 R
See application file for complete search history.

(56) References Cited

U.S. PATENT DOCUMENTS

2018/0207814 A1* 7/2018 Lessing .................... B25J 9/142
2024/0151144 A1 5/2024 Haggerty

FOREIGN PATENT DOCUMENTS

WO WO-2022192190 A1 * 9/2022 ............. B25J 9/142

* cited by examiner

*Primary Examiner* — T. Scott Fix
(74) *Attorney, Agent, or Firm* — LUMEN PATENT FIRM

(57) ABSTRACT

An independent control method of actuators in for example an everting robot or a soft everting robot is provided. The robot has distributed thereto or therewith multiple actuators which steer the robot. Energy is supplied from a single energy line to each of the multiple actuators. This energy enables force and displacement for each of the multiple actuators. Energy from the single energy line to each of the multiple actuators is controlled by a single control line. The single energy line and the single control line can be pneumatic sources or electric sources. The method allows for controlling greater than two actuators with at most two supply lines instead of one supply line per actuator. Reduction of the number of supply lines and complexity of subsystems provides numerous advantages in terms of cost, size, stiffness, friction, amount of material used, ease for tip mounts as well as mobility.

6 Claims, 1 Drawing Sheet

MULTIPLE ACTUATOR CONTROL ON A SOFT EVERTING ROBOT

FIELD OF THE INVENTION

This invention relates to control systems methods for multiple actuators. In particular, the invention relates to systems and methods for multiple actuators on soft everting robots.

BACKGROUND OF THE INVENTION

Soft, tip-extending, pneumatic "vine robots" that grow via eversion are uniquely useful for navigating cluttered and constrained environments. A feature that allows these robots to perform navigation is the use of actuators on the sides of the vine robot. These actuators allow the robot to grow in a specific direction or change its shape. Having multiple discrete actuators along the vine robot body is advantageous because it allows the robot to form more complex shapes and grow through more constrained environments.

One method of controlling multiple discrete actuators is to use one energy supply line per actuator that provides energy or activation to the actuator through pneumatics (pressurized air) or electricity. These designs require every actuator to have its own energy supply line. As the number of actuators increases, the number of supply lines also increases and forces the vine robot to become larger, heavier, and stiffer.

Added thickness and stiffness to the robot is undesirable as it both reduces vine robot turning capabilities, and makes it more difficult or even impossible for vine robots to evert or retract. Alternative designs only allow the tip of the robot to be controlled through a tip-mounted device, or require an additional mechanism to travel within the vine robot to control specific segments. These methods significantly increase the time needed to activate specific actuators, and add additional weight and complexity to the vine robot.

To address these limitations, a method is provided for controlling greater than two actuators with at most two supply lines (one energy line and one control line) and small, light, pneumatic or electrical valves that minimally impact the performance of the vine robot.

SUMMARY OF THE INVENTION

Definition

A soft everting "vine" robot is defined as a robot that navigates an environment through elongation. The vine robot has a thin-walled, hollow, pressurized, compliant body that elongates the body by everting from its tip new wall material that is stored inside the body.

The present invention provides a method of independent control of actuators in a robot in general or specifically an everting robot or a soft everting robot. The robot has distributed thereto or therewith multiple actuators which steer the robot. Energy is supplied from a single energy line to each of the multiple actuators. This energy enables force and displacement for each of the multiple actuators, and whereby the single energy line has connections to each of the multiple actuators. Energy from the single energy line to each of the multiple actuators is controlled by a single control line, whereby the single control line has connections to each of the multiple actuators.

In a further embodiment, the single energy line and the single control line are pneumatic sources. In an alternate embodiment, the single energy supply line and the single control line are electric sources. In yet an alternate embodiment, the single energy supply line is a pneumatic source, and the single control line is an electric source. In still an alternate embodiment, the single energy supply line is an electric source, and the single control line is a pneumatic source.

In another embodiment for pneumatic energy/control each of the multiple actuators have a unique range of control pressure for their respective pneumatic energy actuation, and where the controlling of each of the multiple actuators is accomplished by varying a pressure of a supplied air pressure from the single control line to change the pneumatic energy supply to the actuator, resulting a force and a displacement of one or more of the multiple actuators.

In yet another embodiment for electrical energy/control each of the multiple actuators have a unique control range of electrical parameters for their respective electric energy actuation, and where the controlling of each of the multiple actuators is accomplished by varying an electrical signal from the single control line to change the energy supply to the actuator, resulting in a force and a displacement of one or more of the multiple actuators.

Embodiments of the invention have the following advantages. Complexity, cost and size of subsystems required for vine robots are reduced compared to traditional approaches. For instance, rather than a pressure regulator per actuator, one could have two pressure regulators per set of more than two actuators. Stiffness and amount of material mounted on the vine robot body is reduced compared to traditional approaches by the reduction of the number of supply lines, improving the vine robot's turning capability and ability to cross gaps or otherwise maneuver against gravity. Ease for tip mounts is improved compared to traditional approaches (e.g. sensor or gripper mounting devices located at the tip of the vine robot) to travel along with the vine robot because less supply lines are present. Having fewer supply lines compared to traditional approaches reduces the friction at the vine robot tip during eversion (growth) or inversion (retraction), meaning the vine robot can operate at lower pressure and under less tension.

DETAILED DESCRIPTION

Design—Overview

Figure 1A:
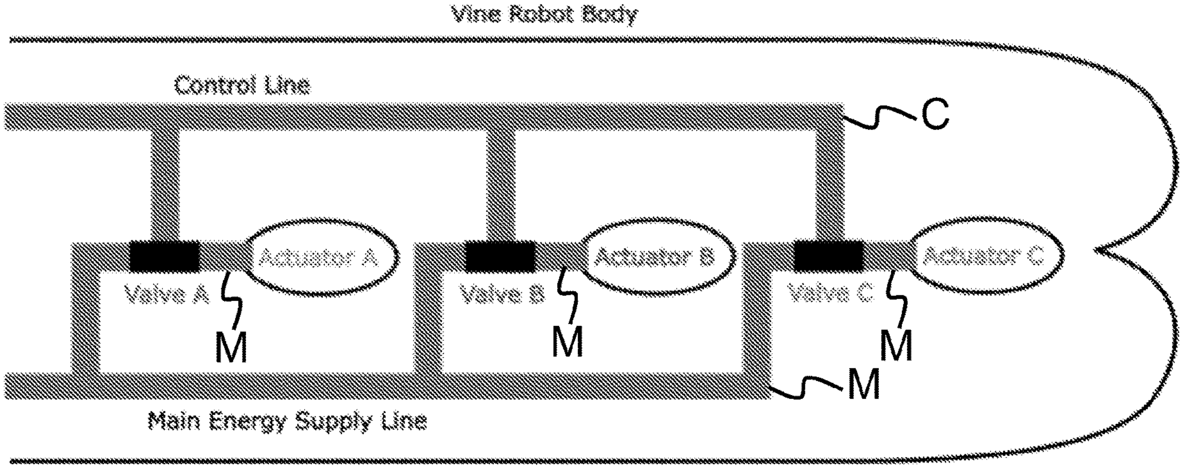
FIG. 1A shows according to an exemplary embodiment of the invention a vine robot body with three discrete actuators controlled by two energy supply lines (M=main and C=control).

Pneumatic actuators are controlled by varying the supplied air pressure to change its force output and displacement. Electronic actuators such as motors, dielectric actuators, or piezoelectric actuators use an electrical signal to provide a force over a displacement. Using multiple actuators on a vine robot allows for versatile maneuvering. To maximally reduce the number of supply lines needed, one must be able to select which actuator to provide energy with from a main energy supply line (FIG. 1A). According to an exemplary embodiment, this is accomplished with valves (A, B and C) between the energy supply line and each actuator. These valves only activate when provided a specific, unique range of pressure or electrical parameter (voltage, current, frequency, etc.). Due to the differences in pneumatic and electronic actuation, the valve control method is dependent on which actuator type is used.

FIG. 1A shows a diagram of an exemplary embodiment of a vine robot body with three discrete actuators controlled by two energy supply lines (M=main and C=control). The main energy supply line (M) is connected via valves to each actuator. Valves are individually controlled by the second energy supply line (C known as the control line) to allow individual actuators to be supplied energy from the main energy supply line. Note, in the case of electrical actuators, the control line could be removed if the valves are controlled by the electrical signal in the main energy supply line.

Figure 1B:
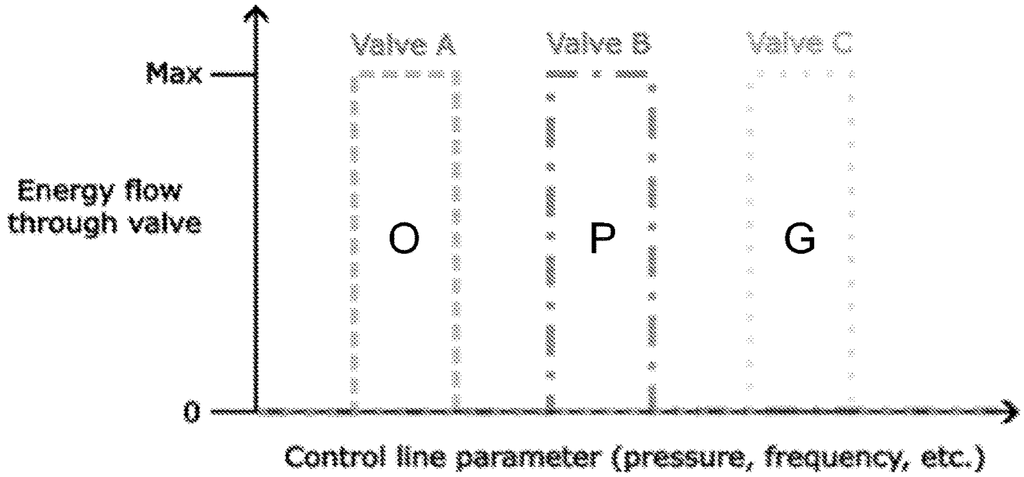
FIG. 1B shows according to an exemplary embodiment of the invention an ideal behavior of the valves following the example of FIG. 1A.

FIG. 1B shows an ideal behavior of the valves following the example of FIG. 1A. If pneumatic control is used, the pressure in the control line can be varied, while for electrical control, the current, voltage, frequency, or digital signals can be varied. As such parameters are changed, individual valves are opened and closed, allowing each actuator to be individually provided energy from the main energy supply line (FIG. 1A). If electrical actuators are used, a supply line parameter could be varied to control the valves without the use of a control line.

Pneumatic Actuator

In the pneumatic actuator case, as indicated, the second energy supply line is utilized (i.e. the control line). The control line is used to control which valve is opened (and thus which actuator is provided with pneumatic energy. The number of actuators that can be controlled by the main energy supply line and control line is determined by the number of valves which can operate in a distinct pressure range within the global pressure range of the supply line (or the analogous electrical signal parameter).

Electrical Actuator

In the electrical actuator case, a control line can be used, but is not necessary. With a control line, the same scheme as with pneumatic actuators is used. However, because electrical signals have many different variable parameters and extremely small integrated circuits, the electrical signal delivered by the main energy supply line itself could be used to select which actuator energy is delivered to. Thus, the valve no longer needs a control line and a single energy supply line (in this case it could be a wire), can control as many actuators as valves can be made that open for a specific signal, parameter, or digital sequence.

Valve Design

The pneumatic valves have an element connected to the control line that actuates at a specific pressure range to open a connection between the main energy supply line and the actuator. This could be done through the combination of a normally closed valve and a normally open valve. At low pressures, the normally closed valve keeps the supply line and actuator disconnected. At the desired pressure, the normally closed valve opens while the normally open valve stays open, thereby connecting the supply line and the actuator. Finally, at high pressures, the normally open valve closes, disconnecting the supply line and the actuator.

The electric valves have analog circuits (such as a band pass filter) which would only allow electrical signals of a certain frequency to pass through either to a valve mechanism (such as a solenoid, piezoelectric actuator, or dielectric actuator) or to the vine robot actuator itself. Additionally, with integrated circuits, digital control can be used. For instance, a specific sequence of high and low voltages could open or close a specific valve. Notably, electrically controlled valves could allow for simultaneous actuator control by using sequences to control how much energy actuators can receive through their "valve" circuit.

Skipping Valves

The activation ranges, the ranges of control input parameter values corresponding to maximum energy flow for each valve, are chosen to allow for buffer zones in between each valve. When the control parameter transitions from the activation range of one valve to the activation range of another valve, its value must past through a buffer zone. While in one of these zones, one could change the parameters of the energy in the main energy supply line (such as pressure or voltage) without affecting any of the actuators.

Here is an example using FIG. 1B. Valve A is active, actuator A is pressurized to 1.0 bar, actuator B is pressurized to 0.5 bar, and actuator C is pressurized to 1.5 bar. The goal is to change the pressure in actuator C to 1.0 bar without changing the pressure in the other actuators. To activate valve C, the control line parameter must first pass through the buffer zone between valve A (orange, O) and valve B (purple, P). While in this zone, the energy flow through all valves is zero, so a change in pressure to the main energy supply line does not affect any actuator. In this zone, the pressure in the main energy supply line is changed to 0.5 bar. The control line parameter then enters the activation zone for valve B, connecting actuator B to the main energy supply line without changing its pressure. Then the control line parameter increases until it is in the buffer zone between valve B (purple, P) and valve C (green, G). The energy flow through all valves is zero in this zone, so the pressure in the main energy supply line is changed to 1.0 bar without affecting the pressure in any of the actuators. Finally, the control line parameter is increased until it enters the activation for valve C, changing the pressure in actuator C from 1.5 bar to 1.0 bar.

Circumferential Actuator Layout

FIG. 1A shows a vine robot with actuators placed in series along its length. Applications of the vine robot usually require two to three such lines placed around the circumference of the robot. A vine robot that operates in 3-dimensional space requires at least three lines of actuators around its circumference. For example, a vine robot can have 3 lines of actuators around its circumference, with each line having three actuators long the vine's length. The actuators can either be connected to each other along the axial length of the vine, as in FIG. 1A, or along the circumference of the vine. The latter configuration would result in three rings of actuators spaced along the length of the vine. The control method in this embodiment can be applied to either of these actuator configurations.

Configurations and Utilization

In its most basic use case, this valve control method can be used with one main energy supply line and some number of control lines. For instance, if the valve mechanisms can operate at 5 different pressure ranges, one can construct a vine robot with 5 discrete actuators with only 2 lines (one supply line and one control line) rather than the previous 5 supply lines.

Additionally, by using multiple sets of valves with multiple supply lines, one can control multiple actuators at once. For instance, in the 10-actuator case, one valve mechanism would control 5 actuators, while another would control the other 5 actuators. If two supply lines were used instead of one, each bank of 5 actuators could be operated independently, allowing two actuators to be controlled at once. This method allows for simultaneous actuator control by increasing the number of supply lines. Note this may not be necessary if electric actuators are used.

Applications

Embodiments of this invention enhance the capabilities of vine robots to traverse challenging environments. Vine robots with multiple segments of actuators can form more complex 2D and 3D shapes and adjust their pose and tip location more finely. The valve design and the unique combination of supply and control lines allows these actuators to be controlled quickly, simultaneously, and with fewer drawbacks than current multi-segment actuator control methods.

What is claimed is:

1. A method of independent control of actuators within a soft everting robot, wherein the improvement comprises:

(a) having a soft everting robot, wherein the soft everting robot has a walled, hollow, pressurized and compliant body, wherein the soft everting robot is capable of elongating the body from its tip new material that is stored inside the body, wherein multiple actuators are distributed along the body of the soft everting robot, and wherein the multiple actuators control elongation and curvature of the soft everting robot;

(b) supplying from a single energy line energy to each of the multiple actuators, whereby the energy enables force and displacement for each of the multiple actuators, and whereby the single energy line has connections to each of the multiple actuators; and (c) controlling by a single control line the energy from the single energy line to each of the multiple actuators, whereby the single control line has connections to each of the multiple actuators.

2. The method as set forth in claim 1, wherein the single energy line and the single control line are pneumatic sources.

3. The method as set forth in claim 1, the single energy supply line and the single control line are electric sources.

4. The method as set forth in claim 1, the single energy supply line is a pneumatic source, and the single control line is an electric source.

5. The method as set forth in claim 1, the single energy supply line is an electric source, and the single control line is a pneumatic source.

6. The method as set forth in claim 1, wherein the multiple actuators are distributed in series.

* * * * *